Sept. 12, 1950     F. D. BANNING     2,521,962
CLAMPING BAND
Filed Oct. 7, 1946
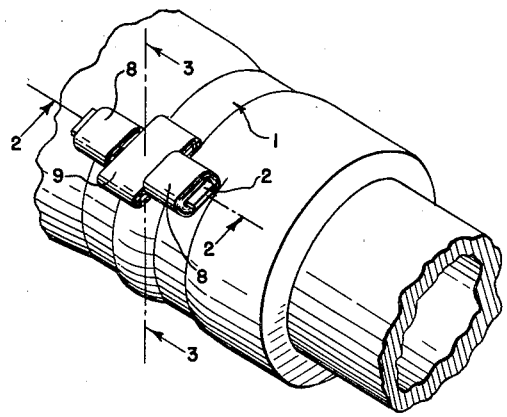
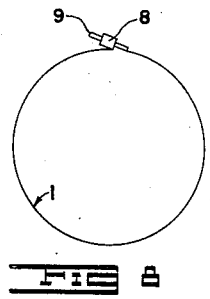
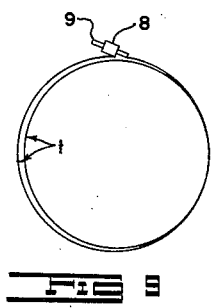
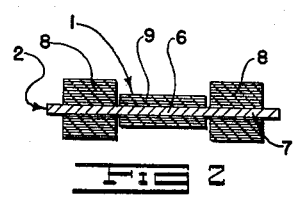
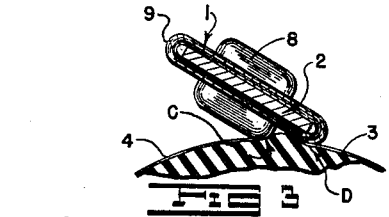
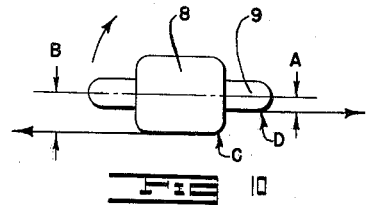
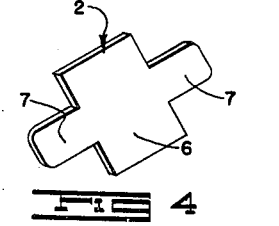
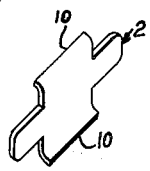
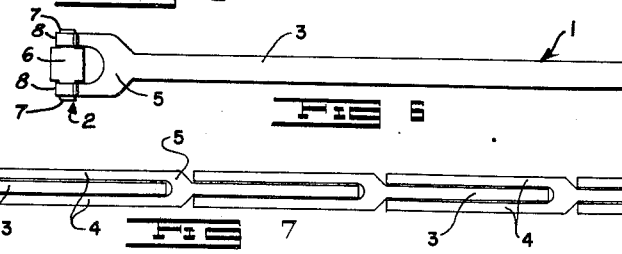
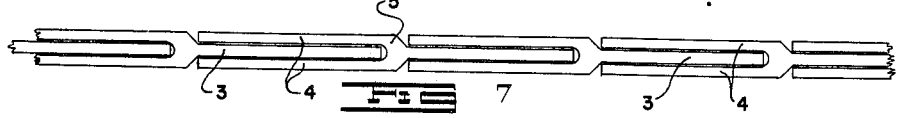
INVENTOR:
FREDERICK D. BANNING
BY:
*Lyon & Lyon*
ATTORNEYS

Patented Sept. 12, 1950

2,521,962

UNITED STATES PATENT OFFICE 2,521,962

CLAMPING BAND

Frederick D. Banning, Topango, Calif.

Application October 7, 1946, Serial No. 701,782

7 Claims. (Cl. 24—19)

My invention relates to clamping bands and my present application constitutes a continuation in part of my copending application for clamping device filed in April 23, 1945, Serial No. 589,894, now abandoned.

Included in the objects of my invention are:

First, to provide a clamping band wherein the extremities are so wrapped about a mandrel that rotation of the mandrel in one direction constricts the band and rotation in the opposite direction expands the band and wherein the mandrel and portions of the band wrapped thereon are so arranged that rotation of the mandrel by pressure exerted by one's fingers is sufficient to produce a strong gripping or constricting force, a force sufficient to clamp or constrict and seal a hose about a fitting.

Second, to provide a clamping band of this character which is self-locking, that is, the mandrel and portions of the band wrapped thereon occupy positions in which the forces resulting from tensile loads on the band cannot cause the mandrel to turn in a direction to loosen the band so that once the band is tightened, even though by hand, it can be depended upon to maintain its position.

Third, to provide a clamping band which is particularly simple and economical of manufacture and which, when wrapped about an object, lies compactly and snugly thereabout.

With the above and other objects in view which may appear hereinafter attention is directed to the accompanying drawings, in which:

Figure 1 is a perspective view of my clamping band employed as a hose clamp.

Figure 2 is a sectional view through the mandrel and the ends of the band wrapped thereon, the section being taken through 2—2 of Figure 1.

Figure 3 is an enlarged sectional view through 3—3 of Figure 1 showing fragmentarily that portion of the band which envelops the hose.

Figure 4 is a perspective view of the mandrel.

Figure 5 is a perspective view of a modified form of the mandrel.

Figure 6 is a plan view of my clamping band as it appears before use.

Figure 7 is a diagrammatical view illustrating the manner in which the band member may be stamped from a strip of material.

Figure 8 is a diagrammatical view illustrating the manner in which the band is wrapped in a single convolution.

Figure 9 is a similar view illustrating the manner in which the band may form two convolutions about the object to be clamped.

Figure 10 is a diagrammatical view of the mandrel and the portions of the band wrapped thereon.

My clamping band comprises generally a band member 1 formed of sheet material and a mandrel 2 about which the ends of the band are wrapped.

The band member 1 includes a single strap or tongue 3 and a dual strap or forked portion 4. These are joined by an integral connecting web 5. The edge of the connecting web 5 adjoining the dual strap is curved and the edges of the web adjoining the single strap converge as shown best in Figures 6 and 7, so that in tension the stresses may be transmitted from the single to the dual strap without unfavorable stress concentration.

As is shown in Figure 7 the band may be punched from strip material in which case the single strap 3 is formed from the material between the legs of the dual strap of the adjacent band.

The mandrel 2 is likewise formed of sheet material but of such thickness as to provide a rigid core about which the extremities of the band may be wrapped. The mandrel 2 includes a central section 6 of a rectangular form from two end edges of which extend end sections 7. The central section 6 and the end sections 7 are much greater in width than thickness, and the central section 6 is much greater in transverse width than the end sections. As illustrated in Fig. 4, the width of the end sections 7 is several times the thickness thereof, and the central section 6 is more than twice as wide as the respective end sections 7. The extremities of the dual strap are wrapped about the end sections 7 to form rolls 8. When the strap is arranged for use as shown in Figure 6, virtually the entire length of the dual strap 4 is wrapped on the end sections 7.

My clamp band 1 is applied to an object by wrapping the single strap 3 about the object, either once as in Figure 8 or twice as in Figure 9, and inserting its extremity between the dual strap rolls 8 and folding this extremity over the central section 6 of the mandrel. The mandrel 2 is then rotated in a direction to wrap the single strap 3 thereon to form a roll 9 and at the same time to unwrap the dual rolls 8. The relative proportions of the central section 6 of the mandrel 2 and the end rolls 8 are such that the periphery of the central section 6 is greater in length than the periphery of the respective dual strap rolls 8. Consequently, on rotating the mandrel 2 in the direction to wind the single strap 3 and unwind the dual strap 4, the loop portion of the band connecting the rolls 8 and 9 is caused to contract. The constricting force obtainable with comparatively slight torsional force on the mandrel 2 may be extremely high, in fact, it is possible to rotate the mandrel 2 by hand and obtain a constricting force more than adequate to clamp a hose about a fitting. The mandrel 2 may be rotated several times to accomplish this tight clamping action. The effect of this rotation is to distribute rather evenly the constricting force of the band so that all parts of the hose are forced radially inward and any tendency of the hose to pinch or fold outwardly from its fitting is eliminated. In fact, under similar conditions of operations it has been found that my clamp will maintain the hose in sealed relation with its fitting against higher pressures than many conventional clamps utilizing screw-threaded connecting means.

It has been found that while the periphery of the duel strap rolls 8 must at all times be less than the single strap roll 9 in order to obtain a constricting action, at least one dimension of the duel strap roll must be greater than the single strap roll in order that the clamping band may be depended upon to maintain its position without the use of auxiliary fastening means, as will be explained below.

The locking action can best be understood from a study of Figures 3 and 10. It will be observed that although the periphery of the strap roll 9 exceeds the periphery of the duel strap rolls 8, that the thickness A of the single strap roll is less than the thickness B of the duel rolls 8, both measured in a plane perpendicular to the plane of the mandrel. If a tensile load, as indicated by the arrows in Figure 10, is applied it will be seen that there will be a resulting force tending to rotate the mandrel 2 clockwise. Rotation in this direction tends to wind on the single strap roll 9 and unwind the duel strap rolls 8 and therefore is in a direction to constrict the band. In operation, the action locking position is substantially as shown in Figure 3, that is, as the band I is drawn up tightly the tension in said band causes the mandrel 2 to rotate to the position in Figure 3 so that the load on the duel straps 4 is applied from point C causing the single strap 3 to bend slightly at point D. Thus, the points C of the coils 8 contact the hose directly and the wound portion of coil 9 engages with an unwound portion of the strap 3. The radial distance from the axis of rotation of the mandrel 2 to the side edges of the central portion 6 or the point D is greater than the radial distance from said axis to the remotest portion C of the outermost coil of the strap rolls 8. Consequently, since the point D is farther from the axis of rotation of the mandrel 2 than the point C, the mandrel 2 is automatically held locked against inadvertent rotation which would loosen the band.

The mandrel 2 may be caused to lie more tangentially to the band than as shown in Figure 3 by bending the same in opposite directions at its side edges to provide slight marginal ribs 10 at the sides thereof as shown in Figure 5.

If the single strap roll 9 is wrapped about the mandrel 2 until all radial dimensions exceed those of the duel strap rolls 8, then this locking condition no longer obtains, but instead the mandrel will tend to unroll as sufficient tension is applied.

It should be observed that the rolls 8 and 9 may take other forms than the substantially rectangular form shown and still satisfy the conditions of Figure 10.

Having fully described my invention, it is to be understood that I do not wish to be limited to the details herein set forth, but my invention is of the full scope of the appended claims.

I claim:

1. A clamping device, comprising: a mandrel in the form of a substantially flat plate having a central portion and end portions projecting from said central portion, and a strap having a double end and an oppositely directed single end, the double end of said strap being initially wrapped upon said end portions of said mandrel, and the single end of said strap being adapted to be wrapped about said central portion; said central portion being of substantially greater width than the combined width of said end portions and initial wrapping thereon.

2. A clamping device as defined in claim 1, in which the central portion of the mandrel is bent in opposite directions at its side edges to form slight marginal ribs at the sides thereof.

3. A clamping device, comprising: a generally flat, elongated metallic mandrel having a central portion and end portions extending from opposite ends of said central portion, and a flexible metallic strap having an intermediate portion and a single band portion extending in one direction from said intermediate portion and a pair of band portions extending in the opposite direction from said intermediate portion, said pair of band portions being prewound in one direction upon said end portions of said mandrel and said single band portion being adapted to be wound in an opposite direction upon said central portion of said mandrel; said central portion having a transverse width which is substantially greater than the transverse width of said end portions and prewound portions of said band.

4. A clamping device, comprising: a mandrel in the form of a substantially flat plate having a central portion and end portions extending from opposite ends of said central portion, and a relatively thin strap having an intermediate portion and a single band portion extending in one direction from said intermediate portion and a pair of band portions extending in the opposite direction from said intermediate portion, said pair of band portions being wound in one direction upon said end portions of said mandrel and said single band portion being adapted to be wound in an opposite direction upon said central portion of said mandrel; said central portion being thinner in one direction than the corresponding dimension of the prewrapped end portions and having a transverse width as well as a periphery greater than said prewrapped end portions.

5. A clamping band, comprising: an elongated flexible band; and a mandrel having a portion upon which one end of said band is prewrapped in one direction and another portion upon which the other end of said band is adapted to be wrapped in an opposite direction, so that one end of the band is unwound while the other is being wound, said one mandrel portion and its prewrapping being thicker in one direction perpendicular to the axis of rotation of said mandrel than the other mandrel portion, and being shorter than said other mandrel portion in another direction perpendicular to said axis of rotation and also perpendicular to said one direction, said other mandrel portion having before being wrapped, a periphery of a length in excess of the length of the periphery of the outermost turn of said prewrapping.

6. A self-locking clamping device, comprising:

a mandrel having a central portion and end portions extending from opposite ends of said central portion, said central portion having a transverse width which is substantially greater than the transverse width of said end portions; and a strap having an intermediate portion and a single band portion extending in one direction from said intermediate portion and a pair of band portions extending in the opposite direction from said intermediate portion, said pair of band portions being prewound in one direction into coils upon said end portions of said mandrel and said single band portion being adapted to be wound in an opposite direction upon said central portion of said mandrel, said central portion of said mandrel being thinner in dimension in a plane perpendicular to its width than the thickness of the prewound coils in the same plane and having side edges disposed a greater distance from the axis of said mandrel than the outermost turn of said prewound coils, whereby when the single band is wound upon said central portion of said mandrel and is drawn up tightly in use the device automatically locks itself against inadvertent unwinding.

7. A self-locking clamping device, comprising: an elongated mandrel having a transverse width throughout its length which is several times greater than its thickness, said mandrel having a central portion and end portions extending in opposite directions from the ends of said central portion, said central portion having a transverse width which is substantially greater than the transverse width of said end portions; and a strap having an intermediate portion and a single band portion extending in one direction from said intermediate portion and a pair of band portions extending in the opposite direction from said intermediate portion, said pair of band portions being prewound in one direction into coils upon said end portions of said mandrel and said single band portion being adapted to be wound in an opposite direction upon said central portion of said mandrel, said central portion of said mandrel having side edges disposed a greater distance from the axis of said mandrel than the outermost turn of said prewound coils, whereby when the strap is drawn up tightly in use the device automatically locks itself against inadvertent unwinding.

FREDERICK D. BANNING.

REFERENCES CITED

The following references are of record in the file of this patent:

UNITED STATES PATENTS

| Number | Name | Date |
|---|---|---|
| 1,494,791 | Lampert | May 20, 1924 |

FOREIGN PATENTS

| Number | Country | Date |
|---|---|---|
| 332,490 | Germany | Mar. 2, 1921 |
| 558,574 | Great Britain | Jan. 11, 1944 |
| 671,878 | France | Sept. 9, 1929 |